A. H. ANTHONY.
AUTOMATIC REGULATOR FOR BOILER FEED APPARATUS.
APPLICATION FILED MAY 22, 1918.
1,290,865. Patented Jan. 14, 1919.
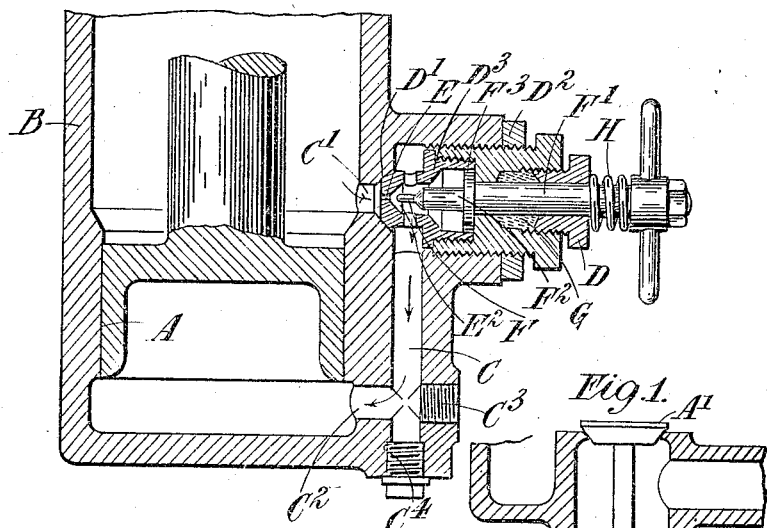
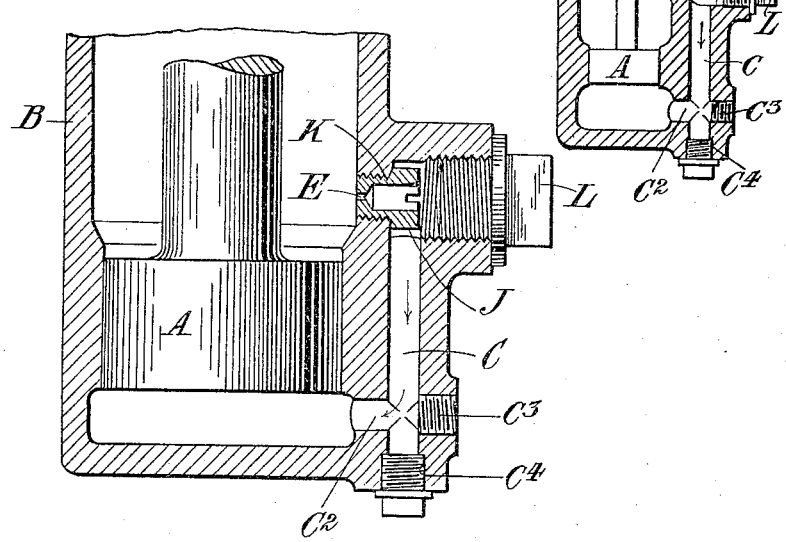
Witnesses,
Inventor
A. H. Anthony

UNITED STATES PATENT OFFICE.

ALFRED HYMAN ANTHONY, OF COLCHESTER, ENGLAND.

AUTOMATIC REGULATOR FOR BOILER-FEED APPARATUS.

1,290,865.   Specification of Letters Patent.   Patented Jan. 14, 1919.

Application filed May 22, 1918. Serial No. 236,051.

*To all whom it may concern:*

Be it known that I, ALFRED HYMAN ANTHONY, a subject of the King of England, residing in Colchester, in the county of Essex, England, have invented certain new and useful Improvements in Automatic Regulators for Boiler-Feed Apparatus, of which the following is a specification.

This invention relates to automatic boiler-feed regulators, that is to say automatic means for regulating the flow of feed-water to a boiler of the kind in which the flow into the boiler past a check-valve is controlled by providing the check-valve with a balancing or controlling piston from whose cylinder the escape of water that has leaked past the piston is automatically stopped, so as to destroy the balance of the check-valve, or otherwise vary the effect of the piston, when feed-water is to enter the boiler.

Apparatus of the said kind is described in British patent specification No. 16097 of 1902, and is also described in my application for Letters Patent No. 11087 dated 5th August 1916.

The passage past the piston of a certain amount of water, usually referred to as leak-water, has heretofore been obtained by making the piston slightly smaller than the cylinder in which it works, or alternatively by drilling a small hole through the piston; both modes have sometimes been employed together.

The defects of these methods are that impurities or sediment in the boiler-feed water sooner or later accumulate in, and block up the space between the balancing-piston and its cylinder. Or a small piece of grit or other impurity will lodge in and block the hole in the piston either partially or wholly.

When the leakage is reduced below a certain amount the regulator becomes uncertain and sluggish in its action, and when almost or completely blocked the regulator will entirely refuse to act. If the piston be the balancing-piston of the check-valve the automatic regulator must then remain out of action until the boiler check-valve can be opened out and cleaned. In the large majority of cases this cannot be done until the boiler is emptied. If the piston be a controlling-piston the regulator must then remain out of action until the parts can be opened up and cleaned which usually occupies a greater period of time than is desirable, especially if the boiler is operating under the heavy duty of full load under naval conditions.

It is the object of the present invention to construct the apparatus in such a manner that the said stoppage for cleaning purposes can be greatly curtailed or even eliminated, and the means, broadly, by which this result is obtained is the situation of the path for the leakage or the aperture through which it passes, not inside the cylinder cavity, but in a more accessible position.

According to the present invention, an automatic boiler-feed regulator of the kind defined is constructed to have the leakage-aperture from one side of the check-valve balancing-piston or controlling-piston, to the other, situated in or constituted by a bleed-duct that is provided external to the cavity of the cylinder for the piston. The said leakage-aperture is conveniently constituted by an aperture in a removable plug fitted in the said duct, or an aperture formed between such a plug and the duct-wall.

This invention, further, provides an orifice in the duct-wall so situated as to enable the leakage-aperture in the duct to be cleaned by a pricker introduced through the said orifice. Such a cleaning pricker is conveniently movably mounted in the duct or an extension thereof and extends fluid-tight through the wall of the duct.

The present invention is further described by reference to the accompanying drawings in which—

Figure 1 is a diagrammatic central vertical section through the apparatus;

Fig. 2 is a central vertical section through the novel portion of the apparatus but omitting the boiler check-valve, and Fig. 3 shows a similar view to Fig. 2 of a modification.

In the construction shown in Figs. 1 and 2 the piston A, constituting the balancing-piston for the check-valve $A^1$, works in a cylinder B which is provided with a bleed-duct C external to the cylinder cavity and operating as a by-pass duct from the upper side of the piston to its underside. The main direction of the duct C is parallel to the axis of the cylinder but it has two branches extending through the cylinder wall to the cylinder cavity, one at $C^1$ and the other at $C^2$. The upper portion of the duct is virtually T-shaped by reason of a radially directed outward extension which is in line with the passage $C^1$. In the said extension is screwed a two-part tubular plug D, D³ of which the inner part D³ has a valve-seating at D¹ in the passage C¹. The inner end of the plug is pierced with a bleed-hole E to constitute the leakage-aperture and the wall of the plug is pierced with openings E² in register with the portion C of the duct. A lock-nut D² is provided for the plug.

Within the plug is slidably mounted a cleaning pricker F whose stem F¹ passes through a stuffing-box G in the head of the plug. A strong compression-spring H is mounted between the head of the pricker and the gland of the stuffing-box so as to tend constantly to hold the pricker in the position in which it is shown in the drawing. The inner portion of the stem of the pricker is reduced in diameter at F² so as not in any position to close the openings E² in the plug and just at this point the stem carries a flange F³ which serves to limit the outward travel of the pricker and incidentally to assist in preventing leakage of water past the stem F¹.

At the lower portion of the duct C² apertures C³, C⁴, at right-angles to one another are provided, of which C⁴ receives a plug, and C³ receives a pipe leading to the apparatus controlled by the float.

The general operation of the device is identical with that described in British Patent No. 16097 of 1902, with the exception that the piston A is made as close a fit as practicable in its cylinder and the leakage takes place through the aperture E instead of down the sides of the piston, or through the piston. Accumulation of sediment around the walls of the piston does not, therefore, interfere with the working of the apparatus and should the aperture E become blocked, partially or completely, it can be immediately cleaned by pushing the pricker F in against the action of the spring H. On releasing the pressure, the spring immediately returns the pricker to the position shown; alternatively the spring H may be omitted and the return action effected by hand. If it is found necessary, as for example by the accumulation of a sufficient quantity of sediment above the piston, the plug D D³ may be unscrewed to clear the seating D¹ and the plug C⁴ in the duct C also removed so as to allow feed-water to flow freely by the ways C¹, C, C⁴ and so flush the parts thoroughly free of sediment.

An alternative construction is shown in Fig. 3 in which a removable plug J pierced with a leakage aperture E is screwed into a passage K in the cylinder-wall corresponding with the portion C¹ of the duct of Fig. 1, and a screw-plug L serves to close the extension to the duct opposite to the portion K and forming therewith the cross-limb of T-formation in conjunction with the portion C of the duct. To clean this construction the plug L is removed and the hole E pricked by a pricker introduced through the orifice which normally carries the plug L, or if necessary, the plug K can be removed also by means of any convenient tool.

It is to be understood that the constructions above described and illustrated in the accompanying drawings are given by way of example, and that this invention may be carried into effect by a wide variety of constructions, all of which fall within its scope.

What I claim as my invention and desire to secure by Letters Patent is:—

1. In apparatus for automatically controlling the flow of feed-water to a boiler, the combination of, a cylinder having means to admit feed-water at feed-pressure to one end thereof, a piston within the cylinder, a duct external to the cylinder giving communication between the two ends thereof, said duct having a closured cleaning-aperture so situated as to render the interior of the duct accessible from outside the cylinder, and having a closured aperture adjacent its inlet orifice, which duct has its entrance orifice fitted with a removable plug shaped to provide a restricted entrance path into the duct, and means operatively connecting the said piston to the boiler-feed check-valve, substantially as set forth.

2. In apparatus for automatically controlling the flow of feed-water to a boiler, the combination of, a cylinder having means to admit feed-water at feed-pressure to one end thereof, a piston within the cylinder, a duct external to the cylinder giving communication between the two ends thereof, said duct having a closured cleaning-aperture so situated as to render the interior of the duct accessible from outside the cylinder, means to form a restricted entrance-way for feed-water into the said duct, which duct has a closured aperture so situated that removal of the closure exposes the said restricted entrance-way to view, and means operatively connecting the said piston to the boiler-feed check-valve, substantially as set forth.

3. In apparatus for automatically controlling the flow of feed-water to a boiler, the combination of, a cylinder having means to admit feed-water at feed-pressure to one end thereof, a piston within the cylinder, a duct external to the cylinder giving communication between the two ends thereof, said duct having a closured cleaning-aperture so situated as to render the interior of the duct accessible from outside the cylinder, and having its entrance orifice fitted with a removable plug shaped to provide a restricted entrance-way into the duct, and which duct has a closured aperture so situated that removal of the closure exposes the said removable plug to view and so dimensioned as to permit passage of said plug therethrough, and means operatively connecting the said piston to the boiler-feed check-valve, substantially as set forth.

4. In apparatus for automatically controlling the flow of feed-water to a boiler, the combination of, a cylinder having means to admit feed-water at feed-pressure to one end thereof, a piston within the cylinder, a duct external to the cylinder giving communication between the two ends thereof, said duct having a closured cleaning-aperture so situated as to render the interior of the duct accessible from outside the cylinder, and having a closured aperture adjacent its inlet-orifice, means to constitute a restricted entrance-way for feed-water into the said duct, which said duct has an aperture adjacent to its entrance orifice closured by a pricker movable fluid-tight in the aperture in such a path that movement in one direction along the path introduces the pricker into the restricted entrance and movement in the reverse direction withdraws it therefrom, and means operatively connecting the said piston to the boiler-feed check-valve, substantially as set forth.

5. In apparatus for automatically controlling the flow of feed-water to a boiler, the combination of, a cylinder having means to admit feed-water at feed-pressure to one end thereof, a piston within the cylinder, a duct external to the cylinder and having its length intersected adjacent its two ends by two branches, of which branches that near the inlet-end of the duct communicates with one end of the cylinder and is provided at its outer end with a removable fluid-tight closure and the other branch communicates with the other end of the cylinder, said duct having a removable fluid-tight closure adjacent the second said branch, means to restrict the entrance of feed-water into the said duct, and means operatively connecting the said piston to the boiler-feed check-valve, substantially as set forth.

6. In apparatus for automatically controlling the flow of feed-water to a boiler, the combination of, a cylinder having means to admit feed-water at feed-pressure to one end thereof, a piston within the cylinder, a duct external to the cylinder formed of a straight portion having at its inlet-end two branches at right-angles to the length and in line with one another whereof one communicates with the inlet-end of the cylinder and the other is provided with a removable fluid-tight closure and having at its other end a branch extending at right-angles to the length of the duct communicating with the other end of the cylinder, and a removable fluid-tight closure situated in the end of the duct beyond the last said branch thereof, means to restrict the entrance of feed-water into the said duct, and means operatively connecting the said piston to the boiler-feed check-valve, substantially as set forth.

In testimony whereof I affix my signature.

ALFRED HYMAN ANTHONY.

Copies of this patent may be obtained for five cents each, by addressing the "Commissioner of Patents, Washington, D. C."